United States Patent [19]
Areaux

[11] Patent Number: 5,853,454
[45] Date of Patent: *Dec. 29, 1998

[54] MASS FLOW GRAVITY FEED APPARATUS FOR CHARGING METAL-MELTING FURNACES WITH DROSS LEVEL COMPENSATOR AND METHOD FOR CHARGING METAL-MELTING FURNACES THEREWITH

[75] Inventor: Larry D. Areaux, Buena Vista, Colo.

[73] Assignee: Premelt Systems, Inc., Kalamazoo, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 704,120

[22] Filed: Aug. 28, 1996

[51] Int. Cl.⁶ ........................................... C22B 9/00
[52] U.S. Cl. ............................... 75/581; 266/901
[58] Field of Search ..................... 266/216, 901, 266/205, 207; 75/594, 686, 687, 709, 581

[56] References Cited

U.S. PATENT DOCUMENTS

| | | | |
|---|---|---|---|
| 5,211,744 | 5/1993 | Areaux | 266/901 |
| 5,407,462 | 4/1995 | Areaux | 266/901 |

*Primary Examiner*—Scott Kastler
*Attorney, Agent, or Firm*—The Firm of Gordon W. Hueschen

[57] ABSTRACT

Mass flow gravity feed furnace charger apparatus includes (1) a charge-well cover having an aperture and (2) an essentially vertical conduit for forming a substantially vertically-oriented column of metal chips or scrap within and above the aperture, and (3) structure for bringing both (1) and (2) into position above a charge well. The conduit is rapidly moveable up and down to force the metal chips or scrap into molten metal in the charge well even when the dross level at the surface of the molten metal is considerable, so that the apparatus and corresponding method permit charging when gravity feed alone is not sufficient or sufficiently rapid. In a preferred embodiment, the conduit has an interior surface provided with gripping means to assist with the downward movement of metal chips or scrap into the molten metal in the charge well when the up and down motion of the conduit is in effect.

26 Claims, 6 Drawing Sheets

MASS FLOW GRAVITY FEED APPARATUS FOR CHARGING METAL-MELTING FURNACES WITH DROSS LEVEL COMPENSATOR AND METHOD FOR CHARGING METAL-MELTING FURNACES THEREWITH

BACKGROUND OF THE INVENTION

1. Field of the Invention

Utilization of metal scrap, especially presized scrap metal chips or the like of new or used metal, especially brass, aluminum, magnesium, titanium, as well as iron and steel, or an alloy thereof, or a metal for alloying one of said metals, by introduction of said metal scrap into a mass of molten metal of which they are formed or an alloy thereof or for the alloying of the same, and at or below the surface of the molten metal pool in the charge well of a metal-melting furnace. Introduction of metal scrap into the charge well of a metal-melting furnace by an improved method involving mass flow gravity feed. Improved apparatus suitable for use in the process.

In the invention of my previous patent, the charge-well cover and the vertically-disposed loading conduit were affixed to each other and not moveable with respect to each other whereas, according to the present invention, the conduit is vertically moveable with respect to the charge-well cover, which is an especially important feature of the invention, especially when the charge-well cover is in place over the molten metal mass in the charge well and the conduit is in place within the confines of the charge-well cover aperture.

2. Prior Art

The state of the art of mass flow gravity feed furnace chargers has been fully presented in my prior U.S. Pat. No. 5,407,462, the disclosure of which patent is incorporated herein by reference.

In my previous U.S. Pat. No. 5,407,462, I disclosed an effective method and efficient apparatus for gravity feeding metal scrap en masse into a molten metal pool in a charge well of a metal-melting furnace, whether a reverberatory furnace, a channel-type induction furnace, or a coreless-type induction furnace, characterized by the highly-desirable advantages of simplicity, rapidity, and economy, but with retention of all of the advantages attributable to previous method and apparatus developments in the area.

The present invention is an improvement over the method and apparatus of my previous U.S. patent which facilitates more rapid melting and incorporation of the metal scrap into the molten metal mass into which introduced despite a buildup of unmelted scrap or dross (i.e., the scum thrown off from molten ore or metal) at and near the point of introduction. This is accomplished by making the vertically-disposed conduit, into which the metal scrap is introduced and inside of which it builds up into a column which gravitationally feeds metal scrap into the molten metal in a furnace charge well, moveable vertically, and especially up and down vertically, with respect to and independent of the apertured charge-well cover.

According to my previous U.S. Pat. No. 5,407,462, when presized metal scrap feed 80 was introduced into the upper loading aperture 54 of the charger conduit 51 at a rate ranging from about five (5) pounds per minute to about sixty (60) pounds per minute, the level of scrap metal feed 80 within the charger conduit interior 511 remained between about 36 inches and 48 inches above the upper surface 23 of the molten metal pool 22, in this test molten aluminum, throughout a two (2)-hour test. During the last one and one-half hours, scrap metal feed at a rate of twenty (20) pounds per minute average was found satisfactory. The density of the metal scrap, in this case aluminum, being fed was 46 pounds per cubic foot. A collection of semi-molten aluminum below the charge-well cover 30 remained fairly constant at about 12 to 15 inches below the upper surface 23 of the molten metal bath 22 in the charge-well cavity 20. This shows that the apparatus and method of my previous patent is fully operative, and indeed it has been shown to be operative in practice.

However, under some situations, especially with continuous operation for long periods, resistance conditions develop within the molten metal bath in the charge well which can seriously impede or even prevent the operation of the previously-available apparatus and use of the simple gravitational feed method of my previous U.S. patent. Such resistance conditions are the development of a crust or formation at the surface of the molten metal which is commonly referred to as the "dross level", wherein the dross becomes so thick that gravity alone may not be sufficient for presized metal chips or scrap to penetrate the surface of the dross-laden molten metal in the charge-well cavity, at least not sufficiently for rapid incorporation into the molten metal mass.

The present apparatus and method are designed to make the mass flow gravity feed furnace charger operative even under those conditions as just described wherein gravity feed operation was previously believed to be unacceptable or even impossible.

This desirable result is effected by introducing a linear movement to the vertical or essentially vertical conduit, a vertical movement which is essentially an up and down vertical movement, which could only be conceived by first making the conduit independent of the charge-well cover with suitable clearance in the aperture thereof to permit such up and down movement of the conduit within the aperture. It was then further necessary to conceive of means for bringing the charge-well cover into position above the charge well and to locate the independently-movable conduit within the aperture thereof, where its vertical up and down motion could be effected. This problem has been solved by method and means whereby both the charge-well cover and the conduit can be brought into position atop the molten metal mass in the charge well essentially as a unit, although not connected in such a manner as to prevent the necessary vertical up and down movement of the conduit within the aperture of the charge-well cover.

As a result of adding this linear vertical up and down movement to the conduit, as the conduit is moved upwardly, flowable material simply moves outwardly to displace the vacant air space formed as the conduit is raised, whereas the downstroke finds that the area previously occupied by the inner-surface of the conduit wall has been displaced by flowable scrap metal, and thereby causes a positive pressure to be applied to the flowable scrap in that area as well as to the column of metal scrap located therein, thereby forcing the entire column of scrap downwardly with as much mechanical force as necessary to penetrate the crust of metal dross atop the molten metal in the charge-well cavity. Thus, in operation, the mass flow gravity feeding of presized metal chips or scrap into the charge well of a metal melting furnace may be effected using the apparatus and method of the present invention even under those conditions where charging by gravity alone may have been unacceptable or even impossible. This highly desirable result is also assisted by provision on the interior surface of the feed conduit of gripping means such as gnurling, lining with a rough or friction-creating material, or the provision of a series of steps, all of which assist in pushing the column of scrap metal downwardly and into the molten metal bath when the vertical gravity-feed conduit is moved vertically in an up and down manner. Using the apparatus and method of the present invention, even the thickest dross level can be readily penetrated by presized metal chips or scrap emanating from the interior of the gravity feed column at the bottom thereof, even when a metal chip or scrap density as little as five (5) to ten (10) percent of the molten metal density, that is, about eight (8) to sixteen (16) pounds per cubic foot, is employed for continuous submergence of the column of metal chips or scrap into the molten metal in the charge well.

OBJECTS OF THE INVENTION

It is an object of the present invention to provide a new and improved method for the utilization of metal chips and scrap which overcomes the problem of crusting or excessive dross level at the surface of the molten metal mass in the furnace charge well. Another object is the provision of apparatus suitable for carrying out such a method. An additional object is the provision of such a method and apparatus which utilize vertical movement of the charger conduit independent of the charge-well cover to effectively download metal chips or scrap into the molten metal in the charge well. A further object of the invention is the provision of such novel method and apparatus wherein both charge-well cover and vertical charger conduit can be brought into and out of position over the charge-well cavity essentially as a unit but wherein the conduit is at all times vertically moveable independent of the cover. Another object is provision of an improved interior surface of the charger conduit which assists with attainment of previously-stated objectives. Yet another object of the invention is the provision of a novel apparatus and method whereby all of the advantageous and highly desirable results set forth in the foregoing section of this patent application are enabled. Still other objects of the invention will become apparent hereinafter, and yet other objects will be obvious to one skilled in the art to which this invention pertains.

SUMMARY OF THE INVENTION

What I believe to be my invention, then, inter alia, comprises the following, singly or in combination:

Mass flow gravity feed furnace charger apparatus for use in conjunction with the charge well of a metal-melting furnace and comprising heat-resistant charge-well cover means adapted to cover a substantial portion of the charge well and having an aperture therein and therethrough and conduit means for forming a substantially vertically-oriented column of metal chips or scrap within and above said aperture, the improvement which comprises said conduit means being vertically movable with respect to said cover means; such apparatus including means for vertically moving said conduit means with respect to said cover means; such apparatus wherein said charge-well cover means and said conduit means are also vertically moveable simultaneously; such apparatus wherein said cover means and said conduit means are vertically moveable simultaneously as a unit; such apparatus including means for simultaneously vertically moving said charge-well cover means and said conduit means; such apparatus including means for simultaneously vertically moving said cover means and said conduit means as a unit; such apparatus wherein said conduit means is capable of up and down movement with respect to said cover means; such apparatus including means for effecting said up and down movement; such apparatus wherein said conduit means is capable of rapid up and down movement with respect to said cover means; such apparatus including means for effecting said rapid up and down movement; such apparatus wherein said conduit means is capable of rapid up and down vertical movement within an aperture in said charge-well cover means; such apparatus including means for effecting said rapid up and down movement; such apparatus comprising a sleeve within said aperture within which the bottom of said conduit means is slideably disposed; such apparatus wherein said means for vertical movement of said conduit means comprises air- or fluid-actuated piston or cylinder means; such apparatus wherein said means comprises oscillating air- or fluid-actuated cylinder or piston means; such apparatus wherein said means for vertical movement of said charge-well cover means and said conduit means comprises threaded vertical rods connected to platform means which is in turn connected by rods to said cover means and also connected to said conduit means, and means for moving said threaded rods upwardly and downwardly; such apparatus comprising a feed control sensor associated with said conduit means for slowing or shutting off metal chip or scrap feed into the conduit means when a column of metal chips or scrap built up in the conduit reaches the level of the sensor; such apparatus comprising upper, middle, and lower sensors associated with said conduit means and wherein the upper sensor is associated with said conduit means for slowing or shutting off metal chip or scrap feed into the conduit means when a column of metal chips or scrap built up in the conduit means reaches the level of said upper sensor, and wherein said middle sensor is associated with means for activation of rapid up and down vertical movement of said conduit means when a column of metal chips or scrap built up in the conduit means reaches the level of said middle sensor, and wherein said lower sensor is associated with means for discontinuing said up and down vertical movement of said conduit means when said column reaches its level; such apparatus wherein the interior surface of the conduit means is provided with gripping means; such apparatus wherein the interior surface of the conduit means is provided with a series of steps suitable for pushing a column of metal chips or scrap formed therein downwardly into a molten metal mass in a furnace charge well; such apparatus comprising spaced collar means attached near the top of said conduit means and pivoted lever means associated with said cylinder or piston for alternately releasably engaging each of said collar means for moving said collar means and said attached conduit means alternately upwardly and downwardly; such apparatus comprising superstructure and wherein means associated with said superstructure for moving said conduit and said cover means vertically as a unit comprises a first platform vertically-movably connected to a second platform which is connected by rods to said cover means and to which second platform said conduit means is vertically movably connected and means for moving said second platform upwardly and downwardly with respect to said first platform; such apparatus wherein said means for moving said second platform comprises a plurality of vertical threaded rods connected to said second platform and means for moving said threaded rods upwardly and downwardly; and such apparatus wherein said means for moving said threaded rods comprises a worm gear screw jack system.

Also, in a method of feeding metal chips or scrap into a mass of molten metal in the charge well of a metal melting furnace by bringing charge-well cover means having an aperture therein into place atop said molten metal mass in said charge well, bringing conduit means into place above said aperture and within said aperture, and providing a column of metal chips or scrap within said conduit means for feeding downwardly into said molten metal mass, the improvement comprising moving said conduit means vertically within said aperture; such method wherein said conduit means is moved upwardly and downwardly; such method wherein said conduit means is moved rapidly upwardly and downwardly; such method wherein said conduit means is oscillated; such method wherein said conduit means is moved rapidly upwardly and downwardly between fixed vertical limits within said aperture; such method wherein said charge-well cover means and said conduit means are brought into place atop the surface of said molten metal mass simultaneously, a column of metal chips or scrap is built up within said conduit means, and said conduit means is then moved rapidly upwardly and downwardly between fixed vertical limits within said aperture; such method wherein said charge-well cover means and said conduit means are brought into place atop the surface of said molten metal mass as a unit; such method wherein metal chips or scrap is fed to said conduit means until a certain predetermined first level of metal chips or scrap is built up in said conduit means, at which point the up and down motion of said conduit means is commenced; such method wherein, when the level of metal chips or scrap is built up in said conduit means to a predetermined second level, the feed of metal chips or scrap to said conduit means is discontinued or slowed; such method wherein said second level is a higher level than said first level; such a method wherein, when the level of metal chips or scrap in said conduit means drops to a predetermined level below said first level, the up and down vertical movement of said conduit means is discontinued and finally, such an apparatus comprising a sensor associated with said conduit means for activation of rapid up and down vertical movement of said conduit means when a column of metal chips or scrap built up in the conduit means reaches the level of said sensor.

BRIEF DESCRIPTION OF THE DRAWINGS

Reference is now made to the drawings, wherein.

DETAILED DESCRIPTION OF THE INVENTION

The present invention, in both its method and apparatus aspects, will be more readily understood from the following detailed description, particularly when taken in conjunction with the drawings, in which all of the significant parts are numbered and/or lettered and wherein the same numbers and letters are used to identify the same parts throughout.

Figure 1:
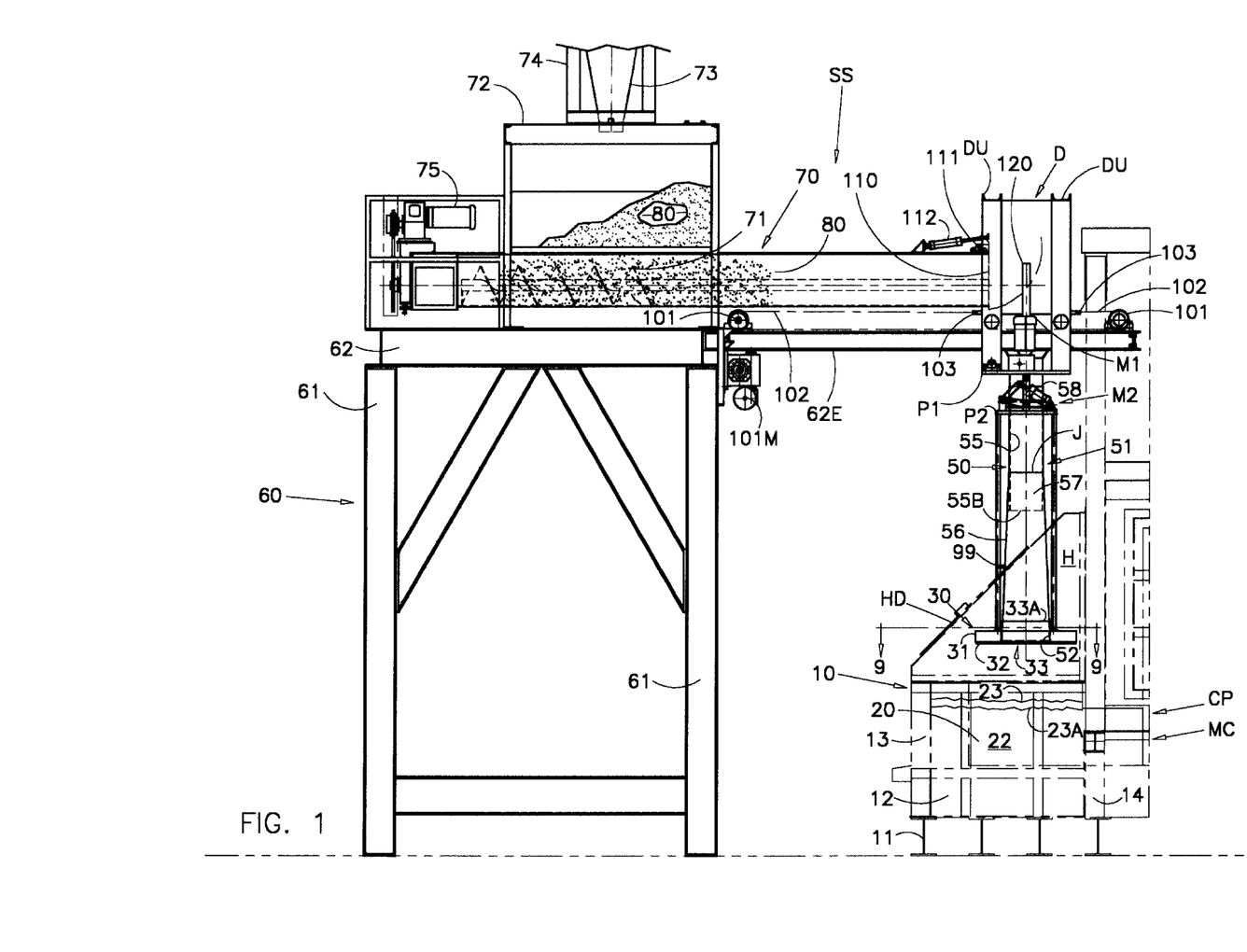
FIG. 1 is a side elevational view, partially schematic and partially in section, showing apparatus according to the invention and illustrating the method of the invention in association with the charge well of a reverberatory furnace, the mass flow gravity feed charger and charge-well cover combination of the present invention being clear from this Figure at the right-hand side thereof and being supported as a unit by superstructure immediately above the charge-well at the lower right-hand corner of the Figure.
Figure 8:
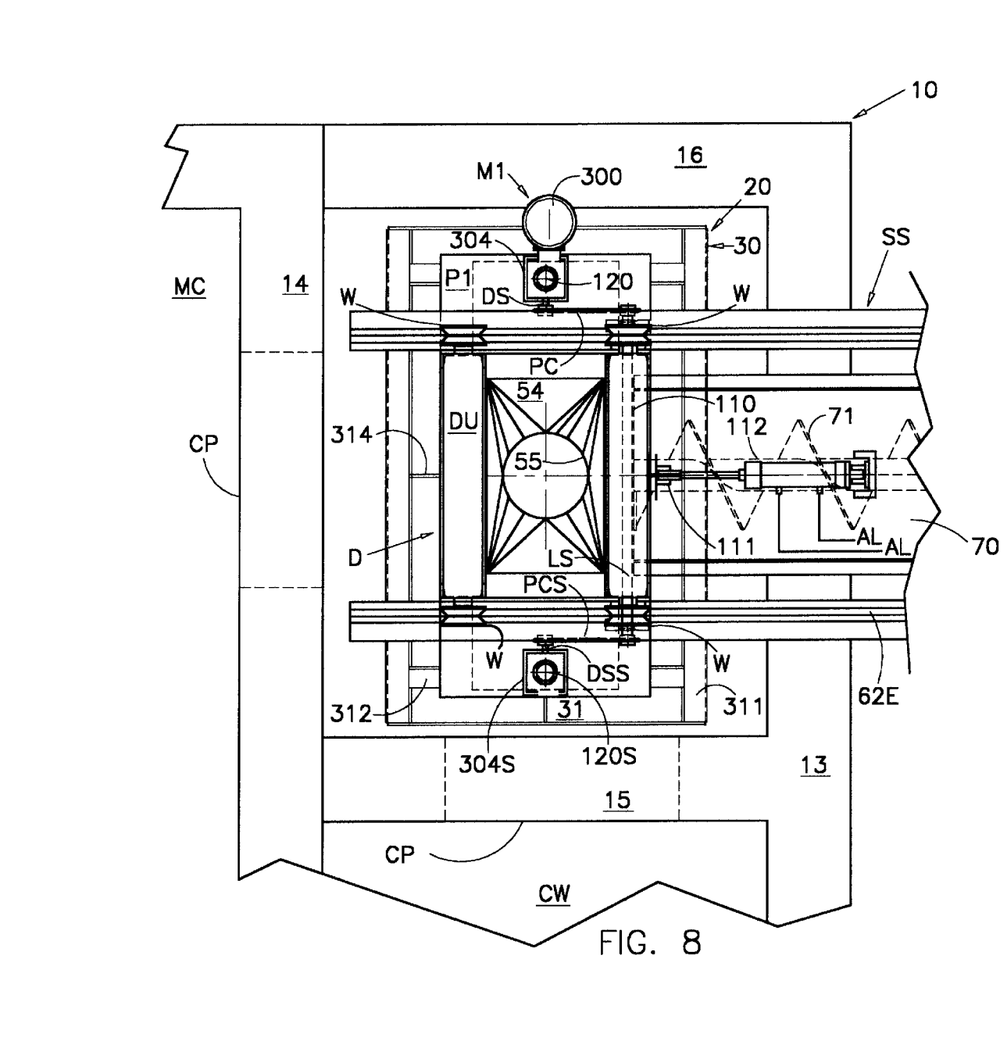
FIG. 8 is an enlarged partial top plan view taken along line 8—8 of FIG. 7 showing apparatus according to the invention and illustrating the method of the invention in which the mass flow gravity feed charger conduit means and charge-well cover of the invention are associated with superstructure, the apparatus and especially the charge-well of the furnace again being shown partially schematically.

The charge-well of a metal-melting furnace, e.g., a reverberatory furnace of refractory material or having the usual refractory lining and fired by combustion burners fed by natural gas or fuel oil or the like which throw flames into the interior of the main chamber of the furnace through flame-introduction means, is shown generally in the Figures at 10. The charge well 10 comprises base supports 11 and bottom 12 and vertical walls 13, 14, 15, and 16 (See FIG. 8.). The charge well cavity is shown at 20 with a mass of molten metal, preferably and usually aluminum, magnesium, titanium, brass, or an alloy thereof, therein being shown at 22. The main chamber MC of the furnace as well as chamber extensions, optional circulation well, and circulation or communication passageways CP are usual and well-known in the art and are not shown or not shown in detail. Ordinarily, the charge well 10 is situated between a circulation well CW and the main chamber MC in such a furnace. However, the configuration of the furnace shown schematically in the Figures and especially in FIGS. 1 and 8 is merely representative inasmuch as the exact configuration of the furnace is entirely optional, a circulation well not always being required and the number of passageways between chambers and the size thereof being varied widely in the art. The point of introduction of a charge of new or used metal chips or scrap into a reverberatory or other type of furnace is in any case at a charge well 10 into a charge-well cavity 20 via some sort of a charging means, as is well known in the art, for example from my previous U.S. Pat. Nos. 5,211,744 and 5,407,462. It is at the charge well 10 that the improved charging apparatus and method of the present invention are importantly operative and applicable and an improvement over the gravity charging device and method of my previous U.S. Pat. No. 5,407,462.

In the illustrated case, the molten metal mass or pool 22, e.g., the brass, aluminum, magnesium, titanium, iron, or steel, or an alloy thereof, or a metal for alloying one of said metals, is shown as having an upper surface 23, ordinarily comprising more or less dross 23A, and upon which is to be superposed charge-well cover 30 usually comprising upper steel structure 31 and lower ceramic structure 32 for the retention of gasses or vaporous materials, such as inert gas supplied to the charge well or gas comprising vaporized impurities or contaminants present on the chips or other scrap metal charged into the molten metal pool or bath 22. As shown in the drawings, cover 30 may advantageously comprise a flat steel plate 31, having refractory material 32 secured therein and clad thereto, or otherwise constituted as such a charge-well cover is described in my previous U.S. Pat. No. 5,211,744. Charge-well cover 30 preferably covers the entire upper surface of charge-well cavity 20, when possible or convenient, and in any event covers as much of the surface of charge-well cavity 20 as is possible and convenient, and in all cases is adapted to cover a substantial portion of the surface of charge-well cavity 20.

Mounted atop charge well 10 is charge-well hood H, equipped with hinged swinging door HD, the said hinged door providing ingress to and egress from the hood H above charge well 10 for the mass flow gravity feed furnace charger 50 which, as shown, is movably supported from superstructure SS for ready movement into and out of hood H and into and out of position above the charge-well cavity 20.

Conduit 51 as shown is cylindrical but may have any other suitable cross-section so long as it is hollow to allow free fall and gravity feed of metal scrap feed 80 in the interior 511 thereof. The substantially vertical or in any case vertically disposed conduit 51 of the mass flow gravity feed furnace charger 50 is associated at its bottom end 52 with charge-well cover 30 and extends to, at least partially into, or even through sleeve 33A in central aperture 33 therein, within which it is slidably disposed. Simultaneously, conduit 51 is supported near its upper end 58 by superstructure SS comprising support frame 60 having vertical segments 61 and upper horizontal segment 62 upon which latter segment are located metal chip or scrap hopper 72 with intake funnel 73 in frame 74 and metal chip or scrap screw feed conveyor 70 comprising feed screw 71 mounted for rotation therein and associated with screw feed conveyor motor means 75, all located generally atop horizontal portion 62 of frame 60. When motor means 75 is activated, metal chips or scrap, especially presized metal chips or scrap, 80 is conveyed by screw 71 along screw feed conveyor 70 and into upper loading aperture 54 of feed tube 55 and thence into conduit 51, feed tube 55 as shown having an enlarged opening 54 for input of presized metal chips or scrap 80 at its upper end. Electric motor means 75, as well as all other electric motors involved, namely, 300 and 101M, are of course connected to a source of power, although not shown.

Mass flow gravity feed furnace charger 50 is advantageously provided with several sections of conduit, an independent upper fixed feed tube 55 and a slidable portion of conduit 51, in turn having an upper section and a lower section, seamed or joined at J, lower section 56 preferably flaring to somewhat greater and conical dimensions as compared to the upper section which is slidable over upper fixed feed tube 55. The overlapping slidable area is sometimes designated 57. Preferably also at least the lower section 56 of conduit 51 is somewhat flared or conical so as to be of greater dimensions at its lower end 52 than at its upper end 58, and upper fixed feed tube portion 55 may be of decreasing dimensions toward its lower end or of uniform cross-sectional dimension throughout, so long as the upper section of conduit 51 is slidable thereover in the overlapping slidable area designated 57.

Lower section 56 of conduit 51 of mass flow gravity furnace charger 50 comprises upper feed-control sensor S3 and intermediate M2-activating sensor S2, in turn respectively connected by appropriate circuitry to screw feed conveyor manually actuated VS (variable speed) motor 75 with standard on/off limit switch to shut it off or slow it down when level S3 is reached (depending upon whether connected to the on/off switch or to the VS function), and to activate the vertical up and down movement of conduit 51 when level S2 is reached by the column of metal chips or scrap 80 in conduit 51, possibly for a limited period if a timer is interposed in the circuitry between S2 and the limit switch controlling M2 and its piston OP. Sensor S1 is a lower sensor for shutting off M2 when the column has reached its lower level and vertical up and down movement of conduit 51 is no longer required. If the column continues to rise (instead of diminishing in height) despite activation of M2, feed control sensor S3 will operate to discontinue or slow down feed when its higher level has been reached.

Toward the lower end 52 of conduit 51 is located inert gas inlet 99 for feeding inert gas into the interior 511 thereof and, as will be apparent from the drawings, interior 511 at open lower end 52 of mass flow gravity furnace charger conduit 51 corresponds and communicates with aperture 33 in charge well cover 30, thus permitting presized metal scrap 80 fed into the system to fall directly to or toward the bottom end 52 of the conduit 51 and directly into the molten metal bath 22 in charge well cavity 20 and to sink thereinto as soon as the weight thereof, as accumulated in mass flow gravity furnace charger conduit interior 511, is sufficient to overcome the resistance provided by the molten metal 22 at the upper surface 23 thereof and dross 23A thereon.

The furnace charger 50 is hung from dolly D, in turn mounted on the superstructure SS by means of axles with rotatable wheels W cooperating with track 62E, which is an extension of horizontal support member 62, by means described in further detail thereinafter. The dolly D, with furnace charger 50 hung from platform P1 constituting the bottom or floor of dolly D, is moved into and out of position directly over furnace charge-well cavity 20 by means of two-way wind/rewind sprockets 101, 101, actuated by electric motor 101M controlled by a manual F/R (forward/reverse) travel switch, and cooperating roller chain 102, attached to the right and left vertical or upright members DU of dolly D by connectors 103. When feed of metal chips or scrap 80 into upper loading aperture 54 of feed tube 55 of mass flow gravity furnace charger 50 conduit 51 has ceased, and screw feed conveyor 70 is inactivated by turning of f motor 75, hinged door 110 at the end of screw feed conveyor 70, which is hingedly mounted by means of a lever arm on axis 111, is pivoted downwardly to close the open end of screw feed conveyor 70 by extending the rod of air- or fluid-actuated piston 112, connected in this case to the plant air line AL and controlled by a single solenoid valve and standard on/off limit switch, thereby pivoting the door 110 downwardly and closing the open end of screw feed conveyor 70. Advantageously, time delay circuitry is included to activate M1 to lift the furnace charger 50 out of charge well 10 approximately ten (10) minutes after feed conveyor 70 is inactivated and door 110 is closed. When screw feed conveyor 70 is again activated, as by manual activation of motor 75, the sequence is reversed, i.e., the piston rod retracted thereby pivoting door 110 upwardly on axis 111, thereby opening the end of screw feed conveyor 70 and permitting metal chips or scrap 80 to again move into upper loading aperture 54. However, with door 110 pivoted downwardly into closed position, and screw feed conveyor 70 inactivated, dolly D with all attachments thereto may readily be moved by means of the sprocket and roller chain system 101, 101M, 102, 103 out of position over charge-well cavity 20 and along track 62E from right to left along track 62E of the superstructure SS shown in FIG. 1 by manually throwing the FR travel switch. The reverse movement into position over charge-well cavity 20 is simply effected by activating system 101, 101, 101M in the opposite direction by again throwing the FR travel switch.

Figure 7:
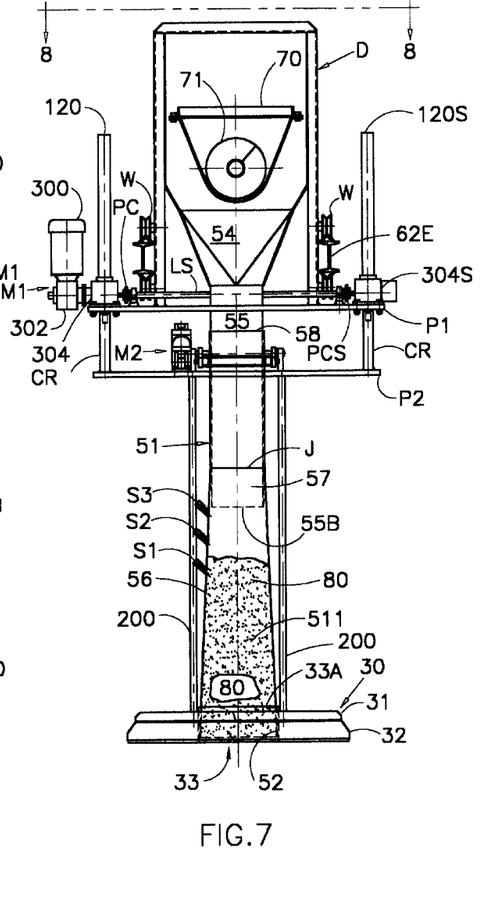
FIG. 7 shows the same situation as FIG. 6, but is an end elevational view of the apparatus instead of the side elevational view of FIG. 6.

Mounted on platform P1, the floor of dolly D, is M1, the mechanism for raising and lowering charge-well cover 30, as well as platform P2, M1 comprising a manually-controlled (FR switch for up or down movement) electric motor 300 for actuating gear reducer or converter 302 and driving worm gear screw jack system 304 within which the drive shaft DS has a worm gear which operates on a worm nut on a threaded vertical screw shaft so that rotation of the drive shaft DS raises or lowers the threaded vertical shaft, the said vertical shaft being shown as 120. (Such mechanism is sometimes referred to as a "ball-screw" drive.) A Joyce (™) ComDrive worm gear screw jack, motor and gear reducer or converter, in a single compact unit, has been found especially suitable for use as M1. For balance, offset lateral shaft LS is connected to drive shaft DS, which extends out of system 304, by connecting sprocket and chain means PC. Lateral shaft LS extends to the opposite side of platform P1, where it drives the drive shaft DSS of slave system 304S for corresponding up and down movement of threaded slave vertical shaft 120S by further connecting sprocket and chain means PCS as shown in FIGS. 7 and 8. Alternative forms of M1 may be level-control cylinders with lengthy internal pistons and piston rods attached to an air or fluid line, e.g., to a plant air or pneumatic supply line, including appropriate source of power and actuating circuitry, or like alternative form of raising and lowering mechanism.

Mounted on platform P2 is mechanism M2, which is the mechanism for vertically moving conduit 51 independently of charge-well cover 30, as shown an oscillating means comprising an oscillating piston OP, connected to the plant air line AL and controlled by a single solenoid valve and standard on/off limit switch, and having a piston rod PR pivotally connected to oscillating arm OA1 which in turn is fixedly connected to transverse shaft TS, in turn fixedly connected to oscillating arms OA2 and OA2A, which are in turn rotatably connected to rollers R, R which thus operate upwardly and downwardly against collars C1 and C2. Since these collars C1 and C2 are fixedly connected to conduit 51 near the upper end thereof, actuation of the oscillating device M2 vertically raises and lowers conduit 51 independent of the mechanism M1 mounted on platform P1 for raising and/or lowering the charge-well cover 50. As stated, oscillating piston or cylinder OP is an air cylinder connected directly to the plant air supply line AL and M2 is activated by a solenoid and switch controlled manually or by sensor S2 and possibly containing a timer interposed in the circuitry between S2 and M2 for predetermined intermittent periods of activation of M2 and OP.

Alternative forms of M2 which may be conveniently employed include other fluid-actuated cylinders or pistons, e.g., pneumatic or liquid actuated cylinders or pistons, or an eccentric crank with connecting arm and bearings driven by an electric motor, as by means of a screw, chain, or V-belt, or an air-operated or electrically- or electromagnetically-operated vibratory drive providing linear or nearly linear up and down motion. The amount of up and down vertical movement of conduit 51 can be as little as one-sixteenth of an inch in either or both directions or as much as one inch or more in either or both directions, whereas the frequency of movement can be as little as one stroke per minute or as often as several thousand strokes per minute. Oscillating piston means OP, as specifically shown herein, is one convenient means for effecting the vertical movement of essentially vertical conduit 51, especially up and down movement thereof.

Vertical connecting rods CR, CR between the threaded vertical shafts 120, 120S of mechanism M1 on P1 and platform P2 are welded or otherwise secured to platform P2 so that, as the mechanism M1 on P1 raises and/or lowers charge-well cover 30, by means of four vertical support bars or rods 200 attached between platform P2 and cover 30, the entire platform P2 and all of its attachments, including conduit 51, are also correspondingly and simultaneously raised and/or lowered.

Figures 2, 2A, 3:
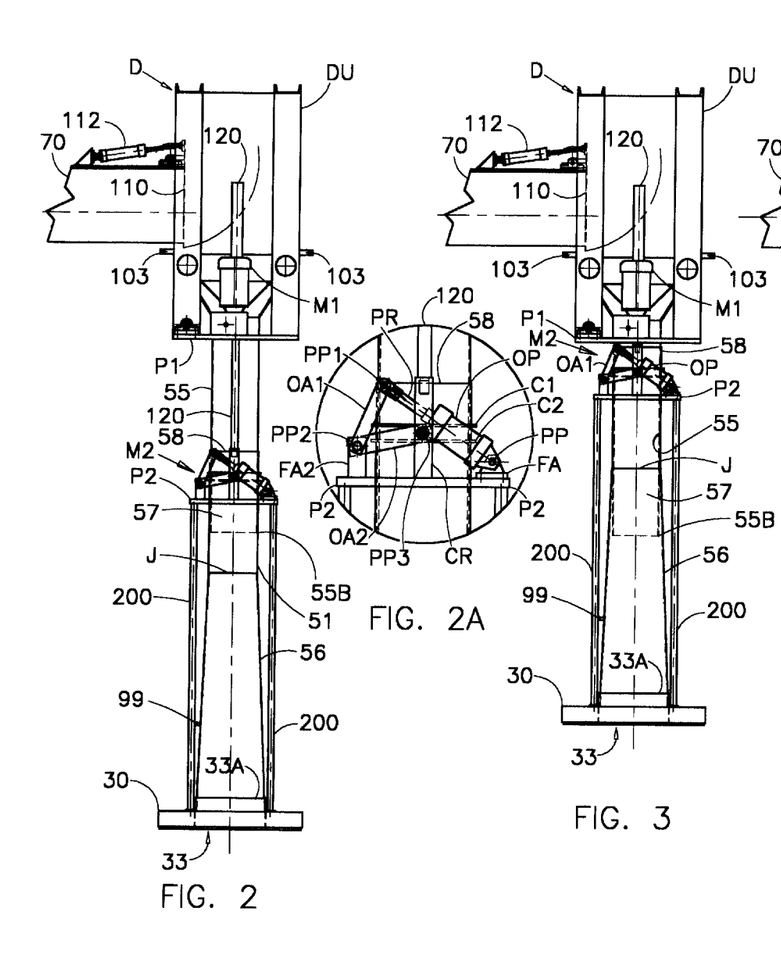
FIG. 2 is a side elevational view, partially in vertical section and not showing all of the lower front side thereof, of the gravity feed charger conduit and charge-well cover combination of the invention supported from a portion of the superstructure shown in FIG. 1 and showing the charge-well cover in downward position and the conduit means in upward position.
FIG. 2A is an enlarged view of the M2 apparatus shown in FIG. 2 for vertical movement of the conduit means of the invention independently of the charge-well cover and showing the position of the M2 means when the conduit means is in upward position.
FIG. 3 is a view like FIG. 2 showing the charge-well cover in upward position and the conduit means in upward position.
Figure 2B:
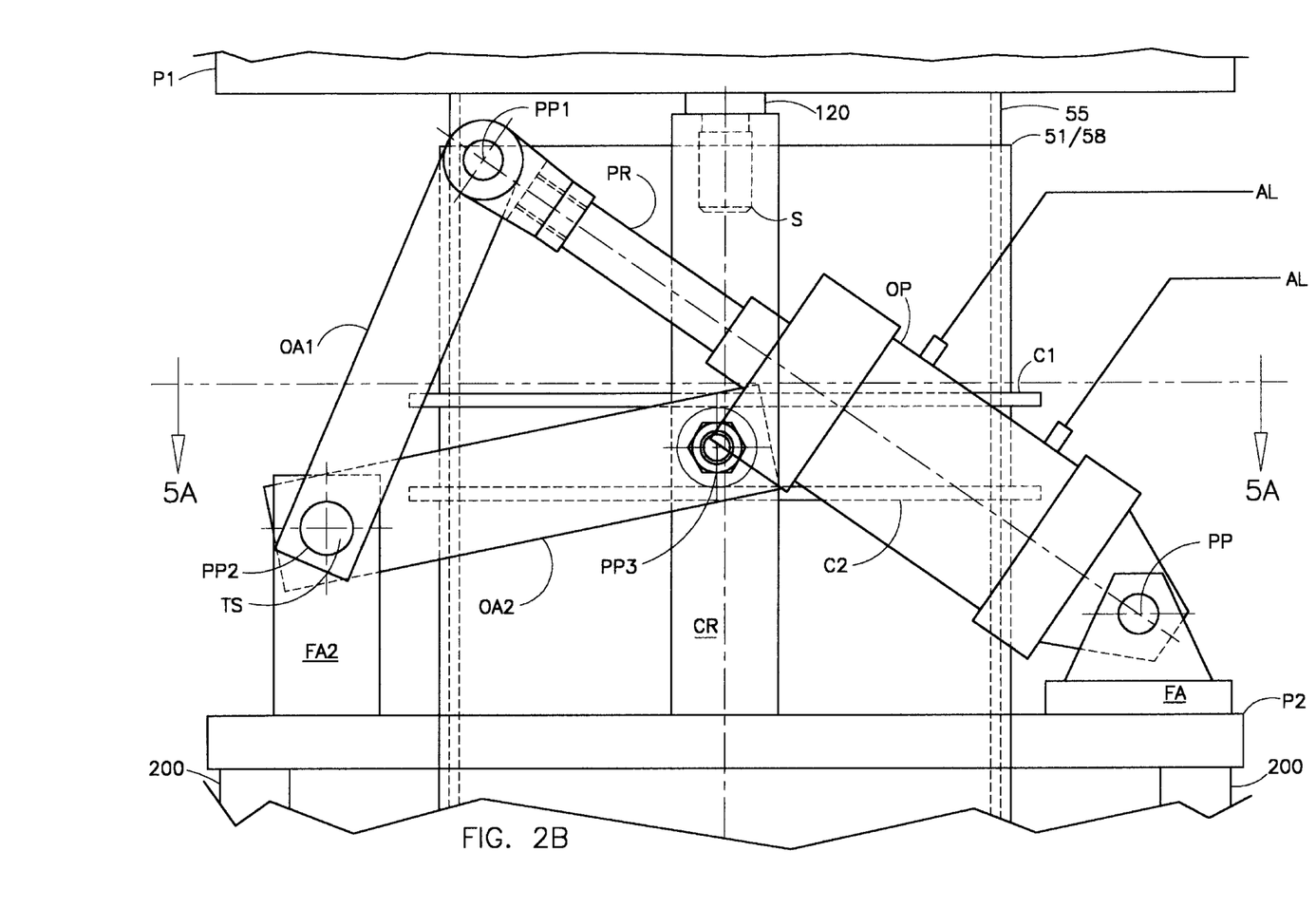
FIG. 2B is a further enlargement of a portion of FIG. 2A.
Figures 4, 4A, 5:
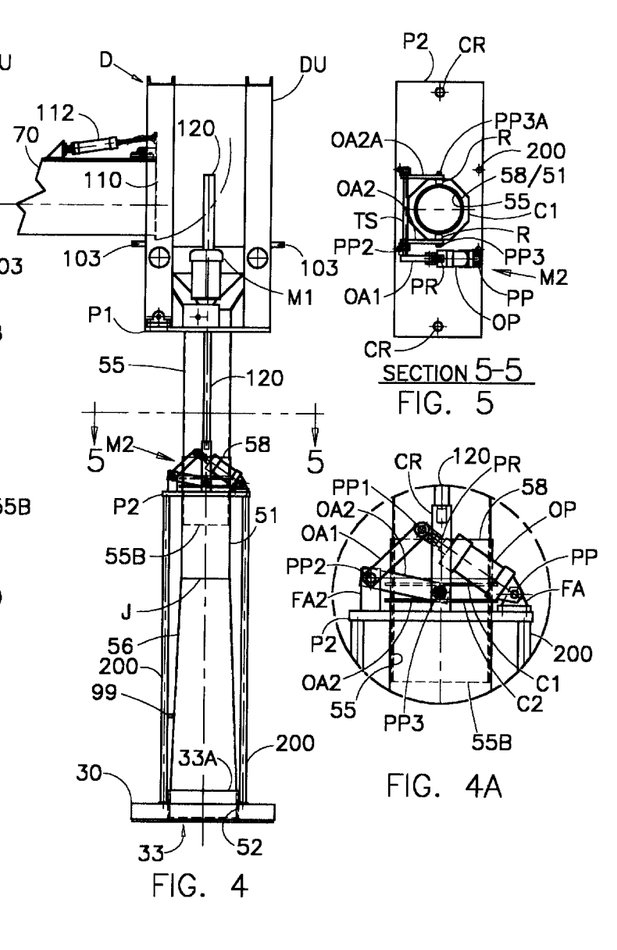
FIG. 4 is like FIG. 2 and FIG. 3, showing the charge-well cover in downward position and the conduit means in downward position.
FIG. 4A is like FIG. 2A, showing the means M2 for moving the conduit means vertically independently of the charge-well cover when the conduit means is in downward position as in FIG. 4.
FIG. 5 is a top view along lines 5—5 of FIG. 4 to better show the means M2 for independently vertically moving the conduit means with respect to the charge-well cover.
Figure 5A:
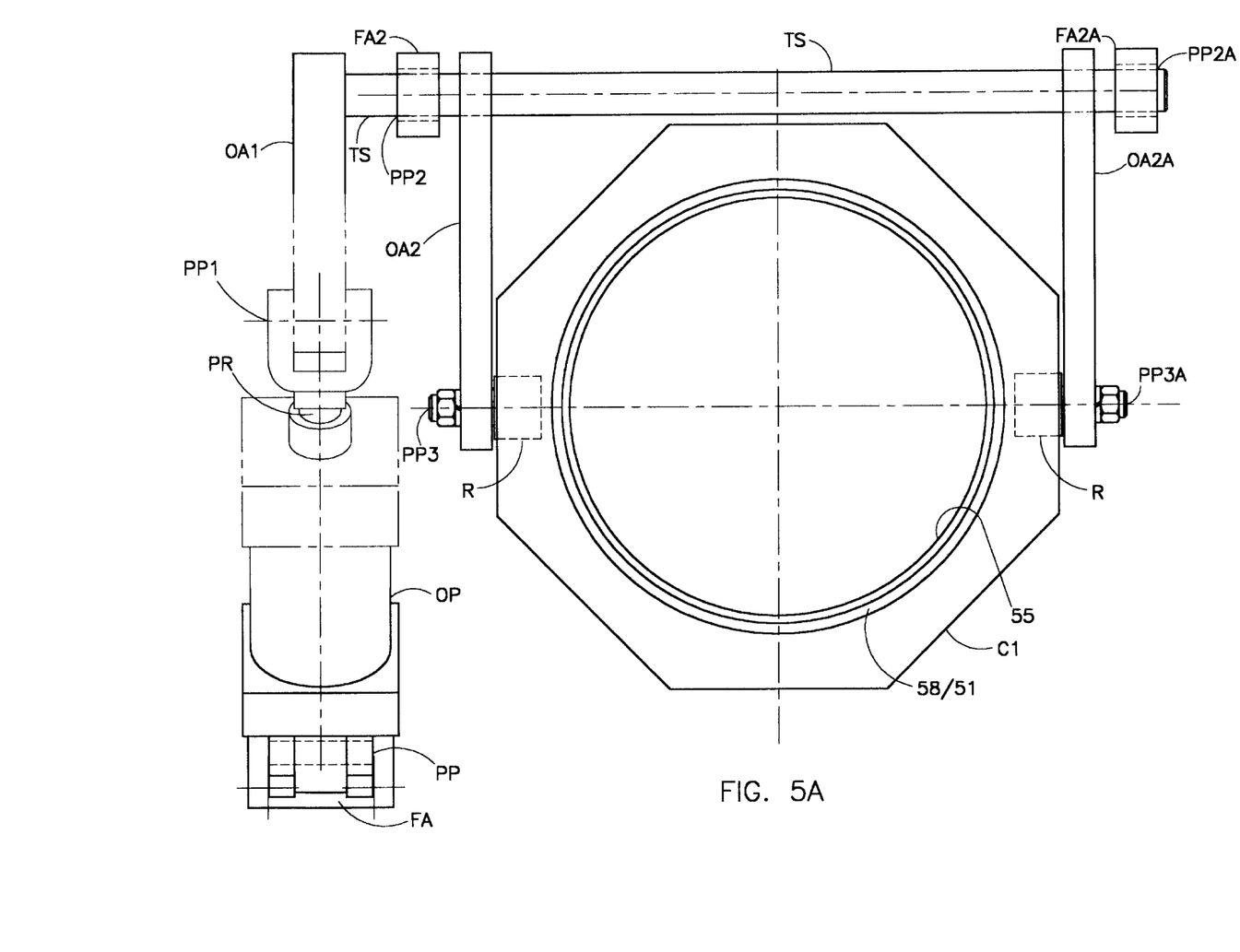
FIG. 5A is a further enlargement of a portion of FIG. 5 taken along the line 5A—5A of FIG. 2B, with the piston rod PR in retracted position, rollers R, R shown in hidden lines, and portions above the plane of 5A—5A shown in phantom lines.
Figure 6:
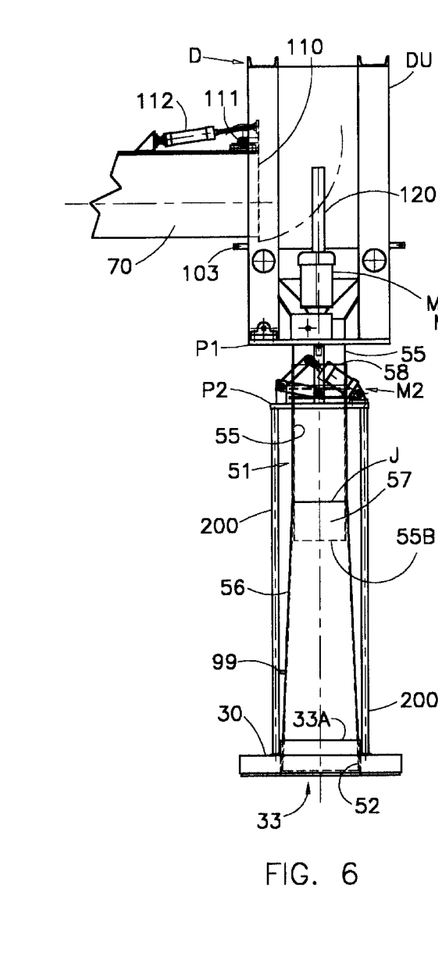
FIG. 6 is another view like FIG. 2 showing the charge-well cover in upward position and the conduit means in downward position.

As shown in the enlargement of FIGS. 2A, 4A, and the top plan view of FIG. 5, and as best shown in the still further enlargements of FIGS. 2B and 5A, which latter is a sectional view along line 5A—5A of FIG. 2B, threaded vertical rod or shaft 120 is attached by swivel S to vertical connecting rod CR, which is in turn connected by welding or the like to the central portion of platform P2, which is the platform upon which the air- or fluid-actuated oscillating device M2 of the invention is situated. Oscillating cylinder or piston OP is pivoted at pivot point PP to fixed arm FA, in turn rigidly affixed to platform P2. Oscillating piston OP has piston rod PR which is pivoted at pivot point PP1 to oscillating arm OA1, which is in turn rigidly affixed to transverse shaft TS, in turn pivoted at pivot points PP2 and PP2A in fixed arms FA2 and FA2A, both rigidly affixed to platform P2. Rigidly affixed to transverse shaft TS are oscillating arms OA2 and OA2A, which are in turn rotatably affixed at pivot points PP3 and PP3A to rollers R, R. Rollers R, R rotatably, releasably, and alternately engage collars C1 and C2, which are rigidly affixed to conduit 51 near its upper end 58 for rapid up and down movement at its bottom 52 with respect to sleeve 33A inside aperture 33 of charge-well cover 30 as well as with respect to linear feed tube 55 at its upper end 58. Attached to platform P2 are well-cover support rods 200 which in turn are attached at their bottom ends to well cover 30. Since platform P2 does not oscillate, well-cover supports 200 do not oscillate, and the oscillatory action of mechanism M2 atop platform P2, when activated, thus results in transmission of rapid up and down movement within sleeve 33A of aperture 30 (where suitable clearance for such movement is provided), to the bottom end 52 of conduit 51 which, as shown, is linear at its upper section but flared at its lower section 56, the upper and lower sections of conduit 51 being joined by welding or the like at juncture J.

In those situations where there is an overlapping between the bottom of linear fill tube 55 and conduit 51, the area of overlap is designated 57. The bottom of fill tube 55 is designated 55B, and the upper edge of conduit 51 is designated 58, whereas the lower end of conduit 51 is designated 52. These elements or aspects, as well as sensors S1, S2, and S3, the functions of which will be further disclosed under "OPERATION", are all visible in FIG. 7.

Figure 7A:
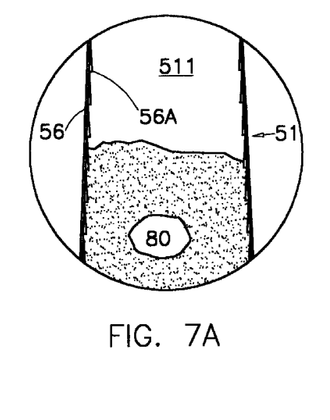
FIG. 7A is an enlarged view of a segment of the conduit means of FIG. 7 showing the irregular or stepped interior surface thereof, which is a preferred embodiment of the invention.

As shown in FIG. 7A, the interior surface of conduit 51 is preferably provided with gripping means 56A, which may be a gnurling, rough or friction-creating surface or lining, or steps, as shown in FIG. 7A being in the form of steps 56A, to assist with the downward pushing or shoving or in any case downward movement of metal chips or scrap 80 when contained within the interior 511 of conduit 51. The conduit 51 and gripping means 56A are accordingly advantageously abrasion resistant.

As shown in FIG. 2B, collars C1 and C2, rigidly attached to conduit 51 near the top 58 thereof, provide upper and lower surfaces against which rollers R, R attached at pivot points PP3 and PP3A to oscillating arms OA2 and OA2A can alternately operate, thereby imparting rapid up and down movement to conduit 51 and especially its bottom 52 when oscillating piston OP is activated.

Figure 9:
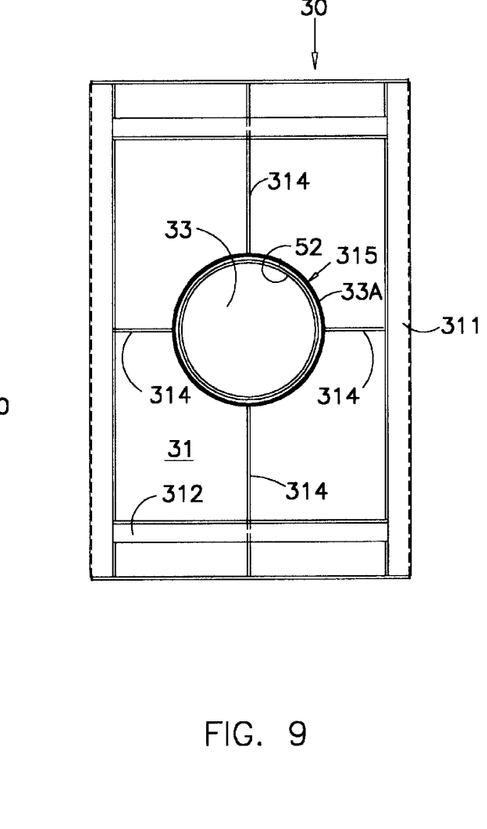
FIG. 9 is an enlarged top plan view taken along line 9—9 of FIG. 1 of a charge-well cover having a central aperture with a sleeve or liner inside of which the conduit means of the invention is slideably disposed.

Referring now to FIG. 8, this is a top plan view showing the vertical walls of charge well 10 and charge-well cover 30 in place over charge well 20, with metal edging 311 and angle iron supports 312 atop metal cover plate 31 of charge-well cover 30 as well as flanges 314 secured by welding or the like to the metal cover plate 31 of the charge-well cover 30 and optionally also secured at the outward ends of flanges 314 by welding or the like to upturned inner portions of angle iron supports 312 at two sides and to the metal edging 311 at the other two sides of metal cover plate 31, as better seen in FIG. 9. Also seen in FIG. 9 is central aperture 33 within the area of which, at the outside edge 315 of aperture 33, are located first the sleeve 33A and then, inside of sleeve 33A, the bottom edge 52 of conduit 51.

Referring again to FIG. 8, dolly uprights DU of dolly D are visible, said dolly D being supported by wheels W rotatably supported on axles extending into or through dolly D at the bottom thereof, for moving the dolly along track 62E of superstructure SS. Motor 300 of mechanism M1 is visible, as well as the ends of threaded vertical shafts 120 and 120S, and also the driving worm gear screw jack system 304 for moving lower platform P2 and all things appended thereto vertically into and out of position above charge well 10 and charge well cavity 20. Also shown is feed tube 55 with its enlarged upper loading aperture 54 into which presized metal chips or scrap 80 moves from screw feed conveyor 70 by means of feed screw 71 when door 110 is in open position. As shown, door 110 is in closed position, by virtue of extension of the piston rod of piston 112, which pivots door 110 downwardly because of the lever arm attached to door 110 which pivots at its end about axis 111. Also shown are drive shaft DS connected by sprocket and chain arrangement PC to lateral shaft LS, in turn connected by pulley and chain arrangement PCS to the drive shaft DSS of further worm gear screw jack system 304S, the S in each case indicating a "slave" relationship to the same component identified by the same symbol without the S, since the motor 300 of mechanism M1 drives only the system 304 and its drive shaft DS for moving both vertical screw shafts 120 and 120S upwardly and downwardly, as previously explained.

Below the top plan view of FIG. 8, and partially in view therein, is the charge-well cover 30, as further depicted in detail in FIG. 9, along with its central aperture 33, showing outer edge 315 thereof and sleeve 33A and bottom 52 of conduit 51 disposed within edge 315 of aperture 33.

Suitable materials of construction for the charger conduit 51 are mild steel or stainless steel depending on the temperature zone involved and abrasion-resistant steel in areas of higher wear. The charge-well cover 30 metal cover plate 31 is normally constructed of approximately 304 stainless steel because of the high temperatures generated in the location of its application, to which an approximately two (2) inch thick ceramic board is attached as ceramic layer 32 to the bottom thereof. One satisfactory refractory board is a product of Pyro Tech and is a non-wetting material. For best results, the stainless steel cover plate 31 and the refractory material 32 should be replaced at least every six (6) months of operation, but such replacement involves only a nominal cost.

OPERATION

In operation, dolly D and appendages thereto including platforms P1 and P2 and furnace charger 50 including conduit 51 as well as charge-well cover 30 are brought into position above charge-well cavity 20 in charge well 10 and mechanism M1 is then activated to lower both charge-well cover 30 and furnace charger 50 into position with the bottom of charge-well cover 30 in contact or approximate contact with the upper surface 23 and dross 23A of the molten metal mass 22 in charge well 20. Door 110 is then upwardly pivoted and electric motor means 75 driving feed screw 71 of feed conveyor 70 is then manually activated, driving presized metal chips or scrap 80 along screw feed conveyor 70 and into the upper loading aperture 54 of feed tube 55 and thence into conduit 51. To prevent oversized scrap pieces from entering the upper loading aperture 54, grizzly bars or other similar structure for screening out oversized scrap pieces may be provided, especially if upstream presizing means for so doing is not by itself adequate. Metal chips or scrap 80 in presized form proceeds from feed conveyor 70 into upper loading aperture 54 of feed tube 55 and then drops to the bottom 52 through interior 511 of vertical cylinder or conduit 51 of the mass flow gravity furnace charger 50 and accumulates at the surface 23 of molten metal mass 22 and dross 23A in charge-well cavity 20 from which it feeds by gravity into the molten metal mass 22. Ordinarily, in actual practice, using a flared cylindrical conduit 51 of a diameter of about 14 inches ID, it requires about three (3) feet of presized metal chips or scrap 80, having a density of about 46 pounds per cubic foot, to force the metal chips or scrap 80 into the molten metal mass 22 in charge-well cavity 20. When the buildup of presized metal chips or scrap 80 within the interior 511 of conduit 51 reaches the sensor S2, the mechanism M2 is activated, at which time the bottom 52 of conduit 51 is oscillated vertically upwardly and downwardly within the confines of sleeve 33A positioned within central aperture 33 of charge-well cover 30. With this upward and downward vertical movement of conduit 51, into and out of contact with the upper surface 23 of molten metal mass 22 and dross 23A in charge-well cavity 20, the dross level 23A at the surface 23 of the molten metal mass 22 is firstly disrupted and, secondly, the column of presized metal chips or scrap 80 within the interior 511 of conduit 51 is shaken and forced downwardly, especially when the interior of the conduit is provided with steps 56A or other irregular or gripping surface, which is a preferred embodiment of the invention. As stated, when the column of metal chips or scrap 80 within the interior 511 reaches the level of sensor S2, mechanism M2 is activated, and such activation may be for extended periods or intermittent periods, as seems most desirable depending upon the dross level encountered during the charging operation. For example, a thirty second interval of up and down movement may be sufficient in the case of a relatively low dross level, whereas a period of rapid up and down movement, of an oscillatory nature, for a period of ten minutes or so may be required when the dross level encountered is considerable. As stated, a timer may be interposed between sensor S2 and M2 for intermittent up and down actuation for predetermined periods if desired.

In the event the column of presized metal chips or scrap 80 in the interior 511 of column 51, despite the up and down movement imparted to column 51 and to the metal chips or scrap 80 therein by mechanism M2, reaches the level of sensor S3, VS drive motor means 75 of feed conveyor 70 is inactivated or its speed varied by simple circuitry between sensor S3 and motor means 75 so that feed of metal chips or scrap 80 into aperture 54 of feed tube 55 is either slowed or discontinued until such time as the motor means 75 is again activated, either manually or automatically, if a timer is interposed in the circuitry between S3 and motor means 75 or, alternatively, if the chip or scrap level falls to the level of S1, the up and down movement of column 51 is terminated by inactivation of M2 and the vertical movement, e.g., shaking, halted at least temporarily, as until the column again builds up to the level of sensor S2.

When motor means 75 is again activated and feed screw 71 of feed conveyor 70 again brings presized chips or scrap 80 into upper loading aperture 54 of feed tube 55, the metal chips or scrap 80 again falls directly to or toward the bottom end 52 of the conduit 51 and directly into the molten metal bath 22 in charge-well cavity 20 and sinks thereinto as soon as the weight thereof, as accumulated in mass flow gravity furnace charger conduit interior 511, is sufficient to overcome the resistance provided by the molten metal 22 and dross 23A at the upper surface 23 thereof or, alternatively, until the up and down vertical motion imparted to conduit 51 by mechanism M2 forces the column of metal chips or scrap 80 into the interior of the molten metal bath 22 through any crust or accumulated dross level 23A at the surface 23 of the molten metal bath 22, advantageously assisted by steps 56A or other irregularity on the surface of the interior 511 of conduit 51.

At the end of the charging operation, motor means 75 is again inactivated as well as mechanism M2, and mechanism M1 on platform P1 is activated to raise both the charge-well cover 30 and the furnace charger 50 upwardly out of contact with upper surface 23 of molten metal mass 22, out of charge-well cavity 20 and thence, by activation of sprockets 101, motor 101M, cooperating roller chain 102 and connectors 103 which moves dolly D to the left along track 62E (in FIG. 1), out of hood H. At this time door 110 is also pivoted downwardly about axis 111 by piston 112, thereby closing the end of screw feed conveyor 70 until such time as another charging operation is undertaken.

It is thereby seen from the foregoing that the OBJECTS of the present invention have been accomplished and that an improved novel, efficient, and economic method and apparatus for the introduction of presized metal chips or scrap into a molten metal pool, especially metal of which said scraps are formed or an alloy thereof, has been provided, all in accord with the SUMMARY OF THE INVENTION, as set forth hereinbefore, and wherein the gravity-fed metal chips or scrap is assisted in entering into the molten mass of metal, even when covered by a considerable thickness of dross, by virtue of the independent vertical and especially upward and downward vertical movement, within the aperture of the charge-well cover, of the essentially vertically-oriented conduit in which a column of metal chips or scrap is provided and from which it is fed into the molten metal pool, as well as by the irregular interior surface configuration of the vertically-oriented conduit itself, and all of the other aspects of the invention as fully set forth hereinbefore under SUMMARY OF THE INVENTION.

It is to be understood that the present invention is not to be limited to the exact details of operation, or to the exact compounds, compositions, methods, procedures, or embodiments shown and described, as various modifications and equivalents will be apparent to one skilled in the art, wherefore the present invention is to be limited only by the full scope which can be legally accorded to the appended claims.

I claim:

1. Mass flow gravity feed furnace charger apparatus for use in conjunction with the charge well of a metal-melting furnace and comprising heat-resistant charge-well cover means adapted to cover a substantial portion of the charge well and having an aperture therein and therethrough and conduit means for forming a substantially vertically-oriented column of metal chips or scrap within and above said aperture, the improvement which comprises said conduit means being adapted for up and down vertical movement within the aperture in said charge-well cover means for shaking down metal chips or scrap from said column into said charge well.

2. Apparatus of claim 1, wherein said charge-well cover means and said conduit means are also vertically moveable simultaneously.

3. Apparatus of claim 1, including means for effecting said up and down movement.

4. Apparatus of claim 1 comprising a sleeve within said aperture within which the bottom of said conduit means is slideably disposed.

5. Apparatus of claim 1 wherein said means for vertical movement of said conduit means comprises air- or fluid-actuated piston or cylinder means.

6. Apparatus of claim 3 wherein said means comprises oscillating air- or fluid-actuated cylinder or piston means.

7. Apparatus of claim 2 including means for vertical movement of said charge-well cover means and said conduit means comprising threaded vertical rods connected to platform means which is in turn connected by rods to said cover means and also connected to said conduit means, and means for moving said threaded rods upwardly and downwardly.

8. Apparatus of claim 1 comprising a feed control sensor associated with said conduit means for slowing or shutting off metal chip or scrap feed into the conduit means when a column of metal chips or scrap built up in the conduit reaches the level of the sensor.

9. Apparatus of claim 1 wherein the interior surface of the conduit means is provided with gripping means.

10. Apparatus of claim 9 wherein the interior surface of the conduit means is provided with a series of steps suitable for pushing a column of metal chips or scrap formed therein downwardly into a molten metal mass in a furnace charge well.

11. Apparatus of claim 5 comprising spaced collar means attached near the top of said conduit means and pivoted lever means associated with said cylinder or piston for alternately releasably engaging each of said collar means for moving said collar means and said attached conduit means alternately upwardly and downwardly.

12. Apparatus of claim 2 comprising superstructure and including means associated with said superstructure for moving said conduit and said cover means vertically comprising a first platform vertically-movably connected to a second platform which is connected by rods to said cover means and to which second platform said conduit means is vertically movably connected and means for moving said second platform upwardly and downwardly with respect to said first platform.

13. Apparatus of claim 12 wherein said means for moving said second platform comprises a plurality of vertical threaded rods connected to said second platform and means for moving said threaded rods upwardly and downwardly.

14. Apparatus of claim 13 wherein said means for moving said threaded rods comprises a worm gear screw jack system.

15. Apparatus of claim 7 wherein said means for moving said rods comprises a worm gear screw jack system.

16. In a method of feeding metal chips or scrap into a mass of molten metal in the charge well of a metal melting furnace by bringing charge-well cover means having an aperture therein into place atop said molten metal mass in said charge well, bringing conduit means into place above said aperture and within said aperture, and providing a column of metal chips or scrap within said conduit means for feeding downwardly into said molten metal mass, the improvement comprising moving said conduit means vertically upwardly and downwardly within said aperture for shaking down metal chips or scrap from said column into said charge well.

17. Method of claim 16, wherein said conduit means is oscillated.

18. Method of claim 16, wherein said conduit means is moved upwardly and downwardly between fixed vertical limits within said aperture.

19. Method of claim 18, wherein said charge-well cover means and said conduit means are brought into place atop the surface of said molten metal mass simultaneously, a column of metal chips or scrap is built up within said conduit means, and said conduit means is then moved upwardly and downwardly between fixed vertical limits within said aperture.

20. Method of claim 19 wherein said charge-well cover means and said conduit means are brought into place atop the surface of said molten metal mass as a unit.

21. Method of claim 19, wherein metal chips or scrap is fed to said conduit means until a certain predetermined first level of metal chips or scrap is built up in said conduit means, at which point the up and down motion of said conduit means is commenced.

22. Method of claim 21 wherein, when the level of metal chips or scrap is built up in said conduit means to a predetermined second level, the feed of metal chips or scrap to said conduit means is discontinued or slowed.

23. Method of claim 22 wherein said second level is a higher level than said first level.

24. Method of claim 21 wherein, when the level of metal chips or scrap in said conduit means drops to a predetermined level below said first level, the up and down vertical movement of said conduit means is discontinued.

25. Apparatus of claim 1 comprising a sensor associated with said conduit means for activation of up and down vertical movement of said conduit means when a column of metal chips or scrap built up in the conduit means reaches the level of said sensor.

26. Apparatus of claim 1 comprising upper, middle, and lower sensors associated with said conduit means and wherein the upper sensor is associated with said conduit means for slowing or shutting off metal chip or scrap feed into the conduit means when a column of metal chips or scrap built up in the conduit means reaches the level of said upper sensor, and wherein said middle sensor is associated with means for activation of rapid up and down vertical movement of said conduit means when a column of metal chips or scrap built up in the conduit means reaches the level of said middle sensor, and wherein said lower sensor is associated with means for discontinuing said up and down vertical movement of said conduit means when said column reaches its level.

* * * * *